United States Patent
Clamont Bello et al.

(10) Patent No.: US 9,440,594 B1
(45) Date of Patent: Sep. 13, 2016

(54) MOTOR VEHICLE WITH INTEGRATED HYBRID MECHANIC CREEPER/UTILITY CART

(71) Applicant: FORD GLOBAL TECHNOLOGIES, LLC, Dearborn, MI (US)

(72) Inventors: Claudio Alberto Clamont Bello, Cuajimalpa (MX); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/861,184

(22) Filed: Sep. 22, 2015

(51) Int. Cl.
*B60R 11/00* (2006.01)
*B60R 5/04* (2006.01)
*B25H 5/00* (2006.01)

(52) U.S. Cl.
CPC ................ *B60R 11/00* (2013.01); *B25H 5/00* (2013.01); *B60R 5/04* (2013.01)

(58) Field of Classification Search
CPC .. B62D 25/2081; B62D 43/10; B62D 43/06; B60R 11/00
USPC ........... 296/37.1, 37.2, 37.6, 37.14; 224/310, 224/311, 542, 539, 544; 280/32.6, 659, 280/651, 655
See application file for complete search history.

(56) References Cited

U.S. PATENT DOCUMENTS

| | | | | |
|---|---|---|---|---|
| 2,611,417 A | * | 9/1952 | Henry | B25H 5/00 108/129 |
| 4,094,526 A | | 6/1978 | Clarke et al. | |
| 4,266,791 A | * | 5/1981 | Myers | B62B 1/208 280/37 |
| 4,647,056 A | * | 3/1987 | Baker | A45C 13/385 190/18 A |
| 5,186,479 A | * | 2/1993 | Flowers | B62B 3/02 206/511 |
| 5,201,536 A | * | 4/1993 | Bono | A47B 85/06 280/30 |
| 5,429,285 A | * | 7/1995 | Kim | B62D 43/10 206/373 |
| 5,649,718 A | | 7/1997 | Groglio | |
| 5,730,449 A | | 3/1998 | Miles | |
| 5,895,062 A | | 4/1999 | Miles et al. | |
| 5,992,331 A | * | 11/1999 | Inoue | A47B 3/0912 108/132 |
| 6,024,376 A | * | 2/2000 | Golichowski | B62B 3/022 16/35 R |
| 6,152,462 A | * | 11/2000 | Barrett | B25H 1/04 280/30 |
| 6,375,055 B1 | | 4/2002 | Spykerman et al. | |
| 6,481,773 B1 | | 11/2002 | Salani et al. | |
| 6,575,491 B2 | | 6/2003 | Miller | |
| 6,695,380 B1 | * | 2/2004 | Hicks | B60R 5/04 296/37.14 |
| 6,877,764 B2 | * | 4/2005 | Sagol | B62B 5/06 280/47.371 |
| 7,032,908 B2 | | 4/2006 | Melvin | |
| 7,093,873 B2 | * | 8/2006 | Nilsrud | B60R 7/02 296/37.14 |
| 7,201,385 B2 | | 4/2007 | Renz et al. | |
| 7,819,409 B2 | * | 10/2010 | Chang | B62B 5/0083 280/47.17 |
| 8,596,671 B2 | * | 12/2013 | Myrant | B62B 1/208 280/47.18 |
| 8,696,014 B2 | * | 4/2014 | Lin | B62B 3/02 280/35 |
| 2004/0227313 A1 | * | 11/2004 | Shockley | B25H 5/00 280/32.6 |
| 2010/0038870 A1 | * | 2/2010 | Hiltz | B25H 5/00 280/32.6 |
| 2014/0140797 A1 | | 5/2014 | Howe | |

* cited by examiner

*Primary Examiner* — Jason S Morrow
(74) *Attorney, Agent, or Firm* — Vichit Chea; King & Schickli, PLLC

(57) ABSTRACT

A motor vehicle is provided. That motor vehicle has a storage area and a hybrid mechanic creeper/utility cart integrated into the storage area.

14 Claims, 5 Drawing Sheets

… (1) …

MOTOR VEHICLE WITH INTEGRATED HYBRID MECHANIC CREEPER/UTILITY CART

TECHNICAL FIELD

This document relates generally to the motor vehicle equipment field and, more specifically, to a motor vehicle equipped with an integrated hybrid mechanic creeper/utility cart.

BACKGROUND

Many motor vehicle owners prefer to perform their own maintenance work on their motor vehicles including, for example, oil changes, tire changes, tire rotations and underbody service and revisions. A mechanic creeper is a low-profile platform supported on caster wheels. Typically, the platform is of sufficient size to support the back, hips and head of a person resting on the platform. The roller or caster wheels at each corner minimize ground clearance. Accordingly, a mechanic creeper provides excellent access assistance when work needs to be done beneath a motor vehicle.

This document relates to a motor vehicle incorporating an integrated mechanic creeper that is also equipped with an optional handle and folding sidewalls allowing the mechanic creeper to also function as a utility cart.

Advantageously, folding sidewalls of the hybrid mechanic creeper/utility cart may be deployed to also provide a convenient storage box compartmentalizing the storage or cargo area of the motor vehicle and better hold or prevent items from rolling around during vehicle operation. Accordingly, it should be appreciated that the integrated hybrid mechanic creeper/utility cart provides a number of benefits and advantages that increase customer satisfaction and pride in vehicle ownership.

SUMMARY

In accordance with the purposes and benefits described herein, a motor vehicle is provided that comprises a storage area and a hybrid mechanic creeper/utility cart integrated into the storage area. The hybrid mechanic creeper/utility cart is supported on wheels. For the purposes of this document, the term "wheels" include wheels, rollers, casters, and the like that allow rolling of the hybrid mechanic creeper/utility cart along an underlying surface such as the ground or a floor.

Further, the hybrid mechanic creeper/utility cart also includes a handle. In addition, the hybrid mechanic creeper/utility cart includes a base and at least one sidewall displaceable between a home position and a deployed position. Further, the storage area includes a receiver for receiving and holding the hybrid mechanic creeper/utility cart. In one possible embodiment, that receiver is a recess in the storage area and the hybrid mechanic creeper/utility cart nests in that recess.

More specifically, the base of the hybrid mechanic creeper/utility cart includes an upper face that is flush with the floor of the storage area when the hybrid mechanic creeper/utility cart is nested in the recess. In one possible embodiment, the upper face of the hybrid mechanic creeper/utility cart is contoured to match the floor in the nested or stowed position. Further, the upper face of the hybrid mechanic creeper/utility cart and the floor may be covered in matching carpeting so that the hybrid mechanic creeper/utility cart is fully integrated into the storage area of the motor vehicle when in the nested or stowed position. In one possible embodiment, the hybrid mechanic creeper/utility cart includes four displaceable sidewalls that may be deployed to project upwardly from the base to form a storage box in the floor when the hybrid mechanic creeper/utility cart is in the nested or stowed position. Those four displaceable sidewalls may be folding sidewalls connected by hinges to the base. Further, the previously mentioned handle may be a folding handle connected to the base by a pivot. In addition, it should be appreciated that the storage area may be the trunk of a motor vehicle, the cargo compartment of a motor vehicle such as an SUV behind the rear seat and/or the bed of a pickup truck or other truck.

In the following description, there are shown and described several preferred embodiments of the motor vehicle and integrated hybrid mechanic creeper/utility cart. As it should be realized, the motor vehicle and integrated hybrid mechanic creeper/utility cart are capable of other, different embodiments and their several details are capable of modification in various, obvious aspects all without departing from the motor vehicle and integrated hybrid mechanic creeper/utility cart as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the motor vehicle and integrated hybrid mechanic creeper/utility cart and together with the description serve to explain certain principles thereof. In the drawing figures.

Figure 5A:
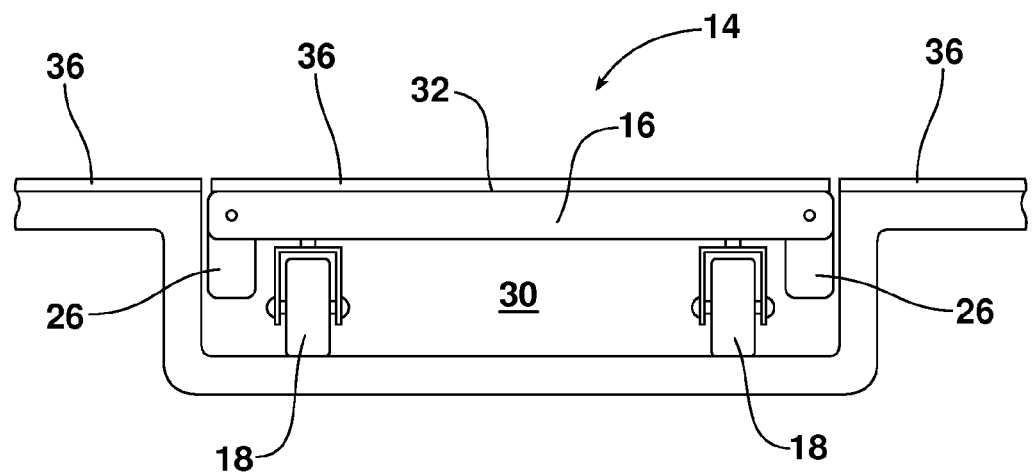
Figure 5B:
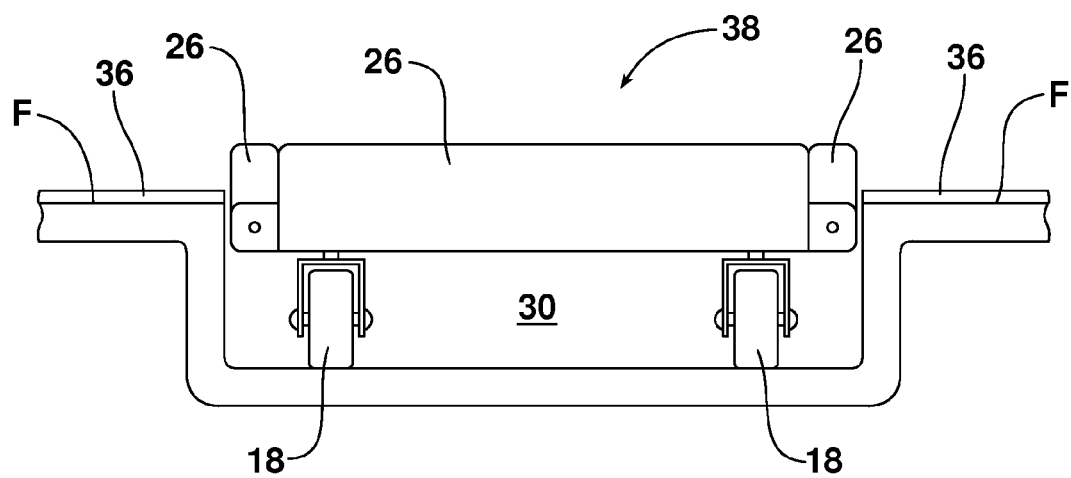

FIGS. 5a and 5b are cross-sectional views illustrating the hybrid mechanic creeper/utility cart nested in a recess in the storage area of the motor vehicle. In FIG. 5a, the displaceable sidewalls are in the home position and the upper surface of the base of the hybrid mechanic creeper/utility cart is flush with the floor of the storage area. In FIG. 5b, the four sidewalls of the hybrid mechanic creeper/utility cart have been folded upwardly to form a storage box for small items in the floor of the storage area.

Reference will now be made in detail to the present preferred embodiments of the motor vehicle and hybrid mechanic creeper/utility cart, examples of which are illustrated in the accompanying drawing figures.

DETAILED DESCRIPTION

Figure 1:
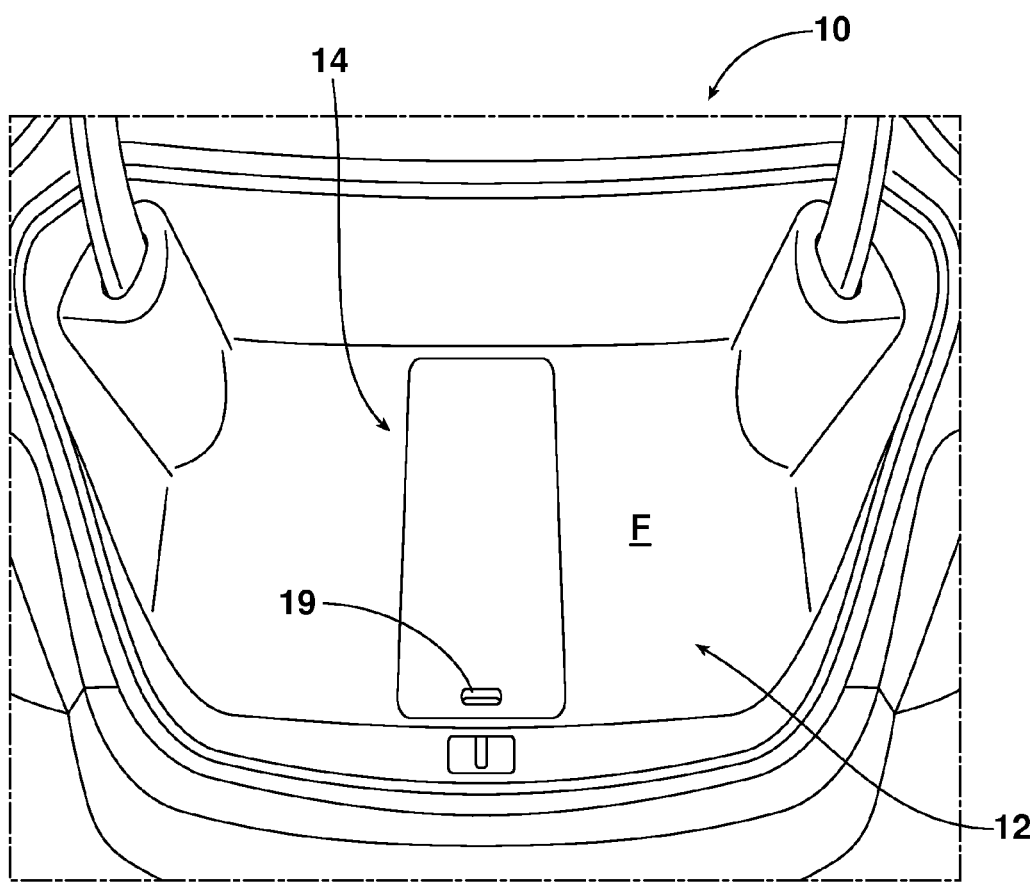
FIG. 1 is a rear perspective view of a motor vehicle with a trunk lid open, illustrating the hybrid mechanic creeper/utility cart in a stowed position wherein the hybrid mechanic creeper/utility cart is received within a recess and integrated into the storage area.
Figure 2:
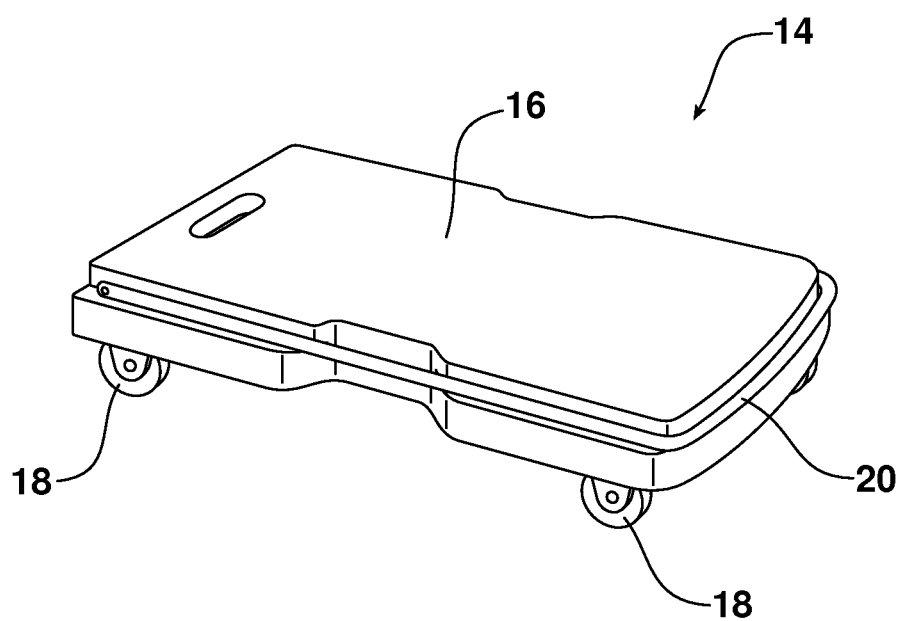
FIG. 2 is a perspective view of the hybrid mechanic creeper/utility cart.
Figure 3A:
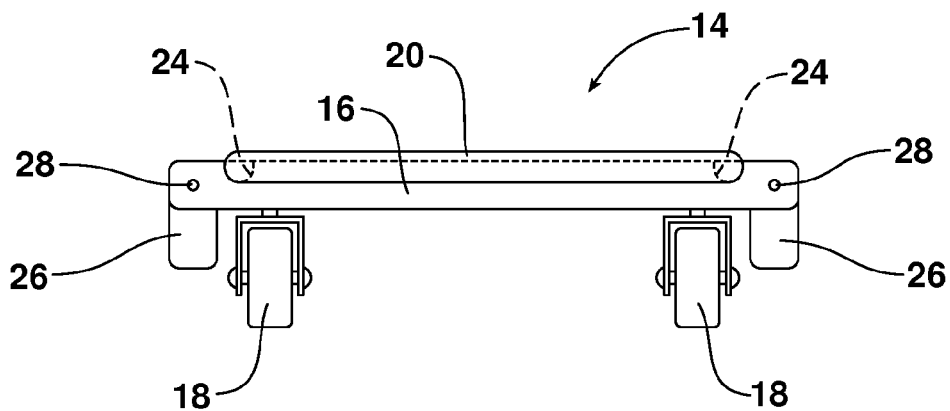
FIG. 3a is an end elevational view of the hybrid mechanic creeper/utility cart illustrating opposed sidewalls in the home position.
Figure 3B:
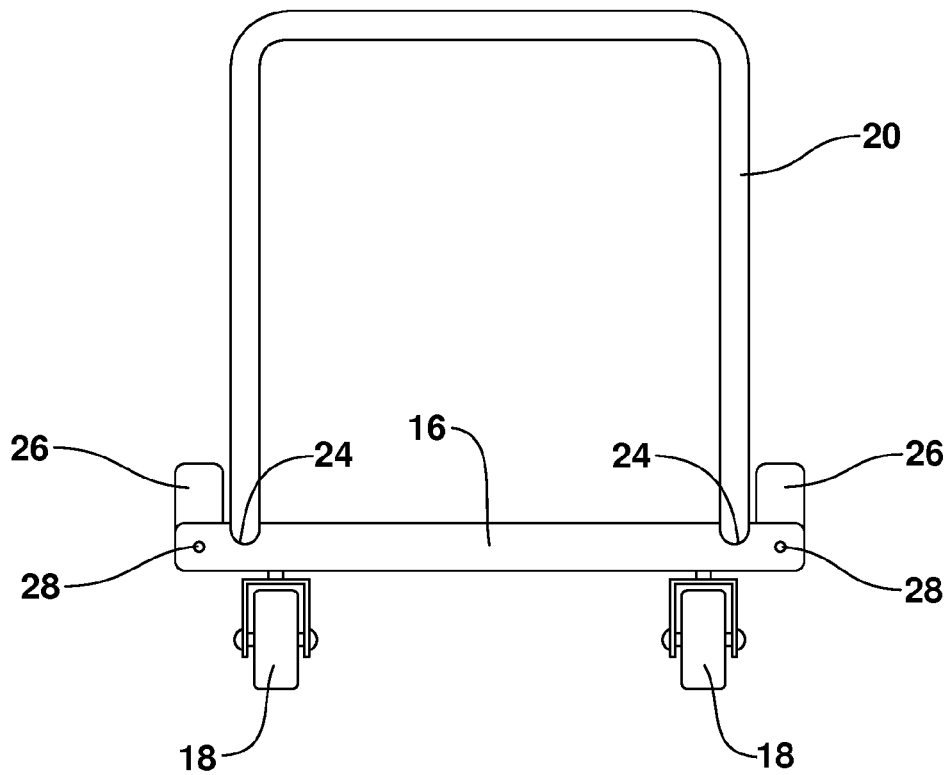
FIG. 3b is an end elevational view similar to FIG. 3a showing the same opposed sidewalls folded upwardly about hinges into the deployed position.
Figure 4:
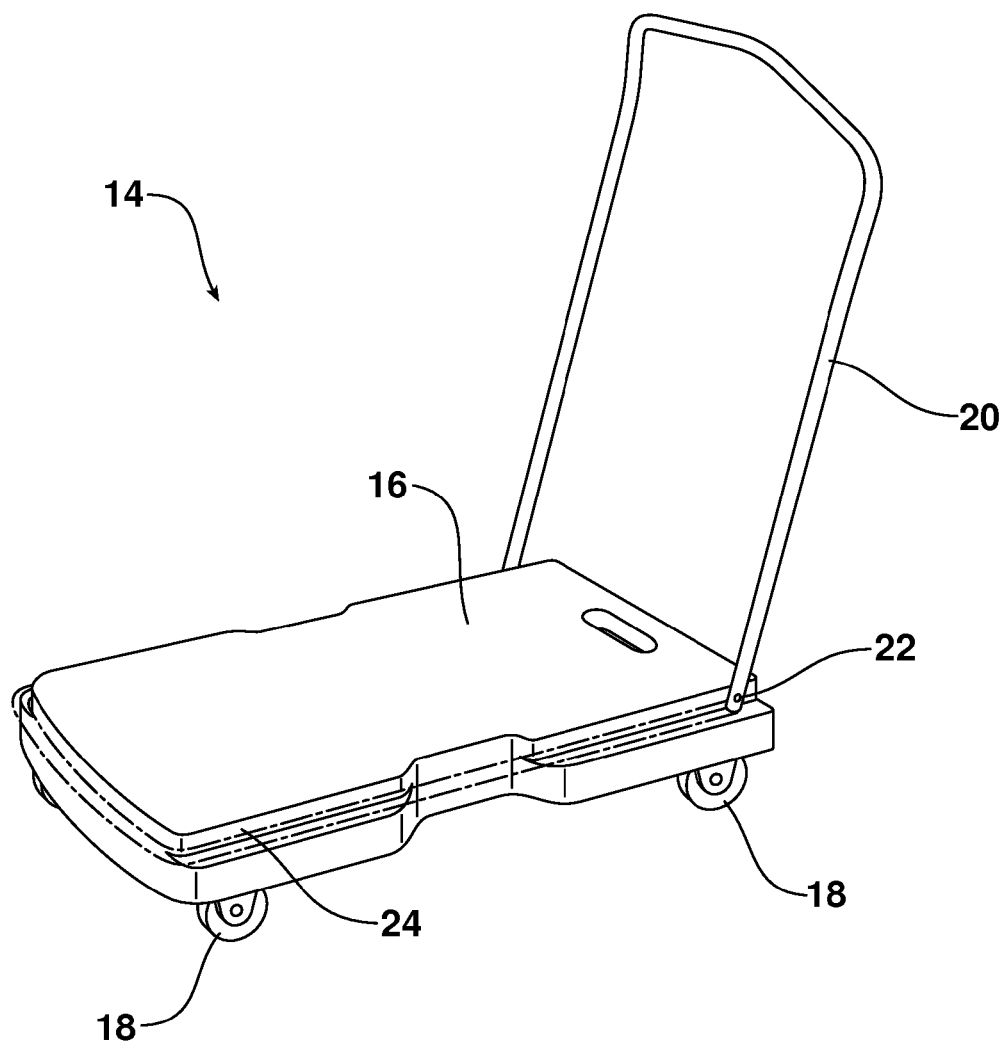
FIG. 4 is a perspective view showing the hybrid mechanic creeper/utility cart with a folding handle illustrated in phantom line in the stowed position and in full line in the deployed position.

Reference is now made to FIGS. 1-5b illustrating a motor vehicle 10 including a storage area 12 and a hybrid mechanic creeper/utility cart 14 integrated into the storage area 12. In the illustrated embodiment, the storage area 12 is a trunk of the motor vehicle 10. It should be appreciated that the storage area 12 could also be, for example, a cargo compartment behind the rear seat of an SUV, the bed of a pickup truck or other truck or any other like motor vehicle storage area. As best illustrated in FIGS. 2-4, the hybrid mechanic creeper/utility cart 14 includes a platform or base 16 supported on a series of low-profile wheels 18. A grab hole 19 provided in the base 16 allows one to lift the hybrid mechanic creeper/utility cart 14 from its stowed position in the floor F of the storage area.

As best illustrated in FIG. 4, the hybrid mechanic creeper/utility cart 14 also includes a handle 20. As illustrated, the handle 20 is pivotally connected to the base 16 by means of pivot pins 22 at each end of the handle (one pivot pin 22 is hidden from view in FIG. 4). As illustrated, the handle 20 is displaceable between a stowed position, illustrated in phantom line in FIG. 4, wherein the handle nests within a groove or channel 24 formed in the base 16 and a deployed position, illustrated in full line in FIG. 4, wherein the handle projects upwardly from the base 16. As should be appreciated, the handle 20 may be locked in the deployed position by any appropriate means such as a latch or pin (not shown), and thereby utilized to push the hybrid mechanic creeper/utility cart 14 along with any items loaded thereon by the operator.

As further illustrated by the embodiment in FIGS. 3a and 3b, the hybrid mechanic creeper/utility cart 14 may also incorporate one or more displaceable sidewalls 26. In the illustrated embodiment, the displaceable sidewalls 26 are connected to the base 16 by means of pivot pins 28. In other embodiments hinges may be used in place of the pivot pins 28. FIG. 3a illustrates the displaceable sidewalls 26 in the home position wherein the sidewalls 26 extend downwardly from the base 16 outboard of the wheels 18. In contrast, FIG. 3b illustrates those sidewalls 26 in the deployed position wherein the sidewalls 26 extend/project upwardly from the base 16 and may be utilized to hold items on the base when the handle 20 is deployed and the hybrid mechanic creeper/utility cart is utilized to transport items from place to place.

Reference is now made to FIGS. 1 and 5a that illustrate the hybrid mechanic creeper/utility cart 14 held in a receiver 30 found in the storage area 12. More specifically, in the illustrated embodiment, the receiver 30 comprises a recess. When the displaceable sidewalls 26 are in the home position and the handle 20 is in the stowed position, the hybrid mechanic creeper/utility cart 14 fully nests in the receiver/recess 30 so that the upper surface 32 of the base 16 rests flush with the floor F of the storage area 12. In one possible embodiment, both the upper surface 32 of the base 16 and the floor F are covered in matching carpet 36. As a result, the hybrid mechanic creeper/utility cart 14 is fully integrated into the storage area 12 when nested in the receiver/recess 30. Here it should be further noted that the upper surface 32 of the base 16 may be contoured to match the floor F when in the stowed position.

As illustrated in FIG. 5b, the hybrid mechanic creeper/utility cart 14 may also be nested in the receiver/recess 30 when the displaceable sidewalls 26 are all in the deployed or upright position. In this configuration, displaceable sidewalls 26 provided along all four sides of the base 16 form a storage box 38 in the floor F. That storage box 38 may be utilized to hold small items and prevent them from rolling around in the storage area 12 during operation of the motor vehicle.

In summary, numerous benefits and advantages are provided by a motor vehicle 10 incorporating a hybrid mechanic creeper/utility cart 14 integrated into the motor vehicle storage area 12. If the vehicle operator desires to complete underbody vehicle maintenance, the operator may simply remove the hybrid mechanic creeper/utility cart 14 from the receiver/recess 30 in the storage area 12, lie upon the upper surface 32 of the low-profile base 16 and roll under the motor vehicle to complete the desired maintenance work. It should be noted that the inclusion of carpeting 36 on the upper surface 32 of the base 16 which matches the appearance of the floor F will also serve as a padding, increasing user comfort.

As an additional benefit, the hybrid mechanic creeper/utility cart 14 may be utilized to transport heavier bulky items utilizing the pivoting handle 20. If desired, the displaceable sidewalls 26 may also be deployed to help hold smaller items on the base 16 during transport. As yet another benefit, those sidewalls 26 may also be deployed to form a storage box in the floor F of the storage area 12 when the hybrid mechanic creeper/utility cart 14 is stowed or nested in the receiver/recess 30.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed is:

1. A motor vehicle, comprising:
   a storage area, wherein said storage area includes a recess;
   a hybrid mechanic creeper/utility cart integrated into said storage area, wherein said hybrid mechanic creeper/utility cart includes a base, said base includes an upper face that is flush with a floor of said storage area when said hybrid mechanic creeper/utility cart is nested in said recess; and
   four displaceable sidewalls that may be deployed to project upwardly from said base to form a storage box in said floor when said hybrid mechanic creeper/utility cart is nested in said recess.

2. The motor vehicle of claim 1, wherein said hybrid mechanic creeper/utility cart is supported on wheels.

3. The motor vehicle of claim 2, wherein said hybrid mechanic creeper/utility cart includes a handle.

4. The motor vehicle of claim 3, wherein said four sidewalls are displaceable between a home position and a deployed position.

5. The motor vehicle of claim 1, wherein said upper face of said hybrid mechanic creeper/utility cart is contoured to match said floor when said hybrid mechanic creeper/utility cart is nested in said recess.

6. The motor vehicle of claim 5, wherein said upper face of said hybrid mechanic creeper/utility cart and said floor are covered in matching carpeting.

7. The motor vehicle of claim 1, wherein said four displaceable sidewalls are folding sidewalls pivotally connected to said base.

8. The motor vehicle of claim 7, wherein said handle is a folding handle connected to said base by a pivot.

9. The motor vehicle of claim 8, wherein said storage area is a trunk of said motor vehicle.

10. A motor vehicle, comprising:
a storage area including a floor;
a recess formed in said floor;
a hybrid mechanic creeper/utility cart held in said recess, said utility cart including a base having an upper face flush with said floor; and
a plurality of displaceable sidewalls carried on said base, wherein said plurality of displaceable sidewalls are deployed to project upwardly from said base and form a storage box in said floor when said hybrid mechanic creeper/utility cart is held in said recess.

11. The motor vehicle of claim 10, further including a plurality of support wheels carried on said base.

12. The motor vehicle of claim 10, further including a folding handle pivotally attached to said base.

13. The motor vehicle of claim 11, wherein said floor and said upper surface of said base are covered in matching carpeting.

14. The motor vehicle of claim 11, wherein said storage area is a trunk of said motor vehicle.

* * * * *